(12) United States Patent
Desai et al.

(10) Patent No.: US 11,334,545 B2
(45) Date of Patent: May 17, 2022

(54) SYSTEM AND METHOD FOR MANAGING SPACE IN STORAGE OBJECT STRUCTURES

(71) Applicant: VMware, Inc., Palo Alto, CA (US)

(72) Inventors: Asit Desai, Cupertino, CA (US); Derek Uluski, Weymouth, MA (US); Alexander T. Garthwaite, South Hamilton, MA (US); Sunil Satnur, Cupertino, CA (US); Ilya Languev, Palo Alto, CA (US); Tan Li, Mountain View, CA (US); Raveesh Ahuja, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 368 days.

(21) Appl. No.: 16/112,698

(22) Filed: Aug. 25, 2018

(65) Prior Publication Data
US 2020/0065408 A1 Feb. 27, 2020

(51) Int. Cl.
*G06F 16/22* (2019.01)
(52) U.S. Cl.
CPC ................................ *G06F 16/2246* (2019.01)
(58) Field of Classification Search
CPC .................................................. G06F 16/2246
See application file for complete search history.

(56) References Cited

U.S. PATENT DOCUMENTS

| 9,753,813 | B1* | 9/2017 | Fan | G06F 11/1446 |
|---|---|---|---|---|
| 11,086,524 | B1* | 8/2021 | Sun | G06F 3/068 |
| 2010/0191897 | A1* | 7/2010 | Zhang | G06F 12/0246 |
| | | | | 711/103 |
| 2010/0280996 | A1* | 11/2010 | Gross, IV | G06F 16/188 |
| | | | | 707/649 |
| 2011/0252067 | A1* | 10/2011 | Marathe | G06F 16/9024 |
| | | | | 707/797 |
| 2013/0204902 | A1* | 8/2013 | Wang | G06F 16/2365 |
| | | | | 707/797 |
| 2015/0254007 | A1* | 9/2015 | Wood | G06F 3/0605 |
| | | | | 711/114 |

* cited by examiner

*Primary Examiner* — Vaishali Shah
(74) *Attorney, Agent, or Firm* — Loza & Loza, LLP

(57) ABSTRACT

System and method for managing space in storage object structures stored in a storage system uses an object B tree structure to manage a storage object in a storage object structure in the storage system, which provides virtual physical block addresses for data of the storage object and for metadata of nodes of the object B tree structure. The metadata of the nodes of the object B tree structure is written in the storage object structure using first real physical block addresses, which are translated from the virtual block addresses for the metadata of the nodes of the object B tree structure using a metadata system file B tree structure. The data of the storage object is written in the storage object structure using second real physical block addresses, which are translated from the virtual block addresses for the data of the storage object using a data system file B tree structure.

14 Claims, 11 Drawing Sheets

SYSTEM AND METHOD FOR MANAGING SPACE IN STORAGE OBJECT STRUCTURES

BACKGROUND

Snapshot technology is commonly used to preserve point-in-time (PIT) state and data of a virtual computing instance (VCI), such as a virtual machine. Snapshots of virtual computing instances are used for various applications, such as VCI replication, VCI rollback and data protection for backup and recovery.

Current snapshot technology can be classified into two types of snapshot techniques. The first type of snapshot techniques includes redo-log based snapshot techniques, which involve maintaining changes for each snapshot in separate redo logs. A concern with this approach is that the snapshot technique cannot be scaled to manage a large number of snapshots, for example, hundreds of snapshots. In addition, this approach requires intensive computations to consolidate across different snapshots.

The second type of snapshot techniques includes tree-based snapshot techniques, which involve creating a chain or series of snapshots to maintain changes to the underlying data using a B tree structure, such as a B+ tree structure. A significant advantage of the tree-based snapshot techniques over the redo-log based snapshot techniques is the scalability of the tree-based snapshot techniques. However, the snapshot structure of the tree-based snapshot techniques is intertwined and complex, especially when snapshot sizes and snapshot numbers are large. In addition, the amount of data required to be stored for the snapshot structure can be unexpectedly large. Thus, an important aspect of a snapshot system using a tree-based snapshot technique is efficiently managing the stored data for the snapshot structure, which includes the current state of the storage object and any snapshot of that storage object.

BRIEF DESCRIPTION OF THE DRAWINGS

Throughout the description, similar reference numbers may be used to identify similar elements.

DETAILED DESCRIPTION

Figure 1:
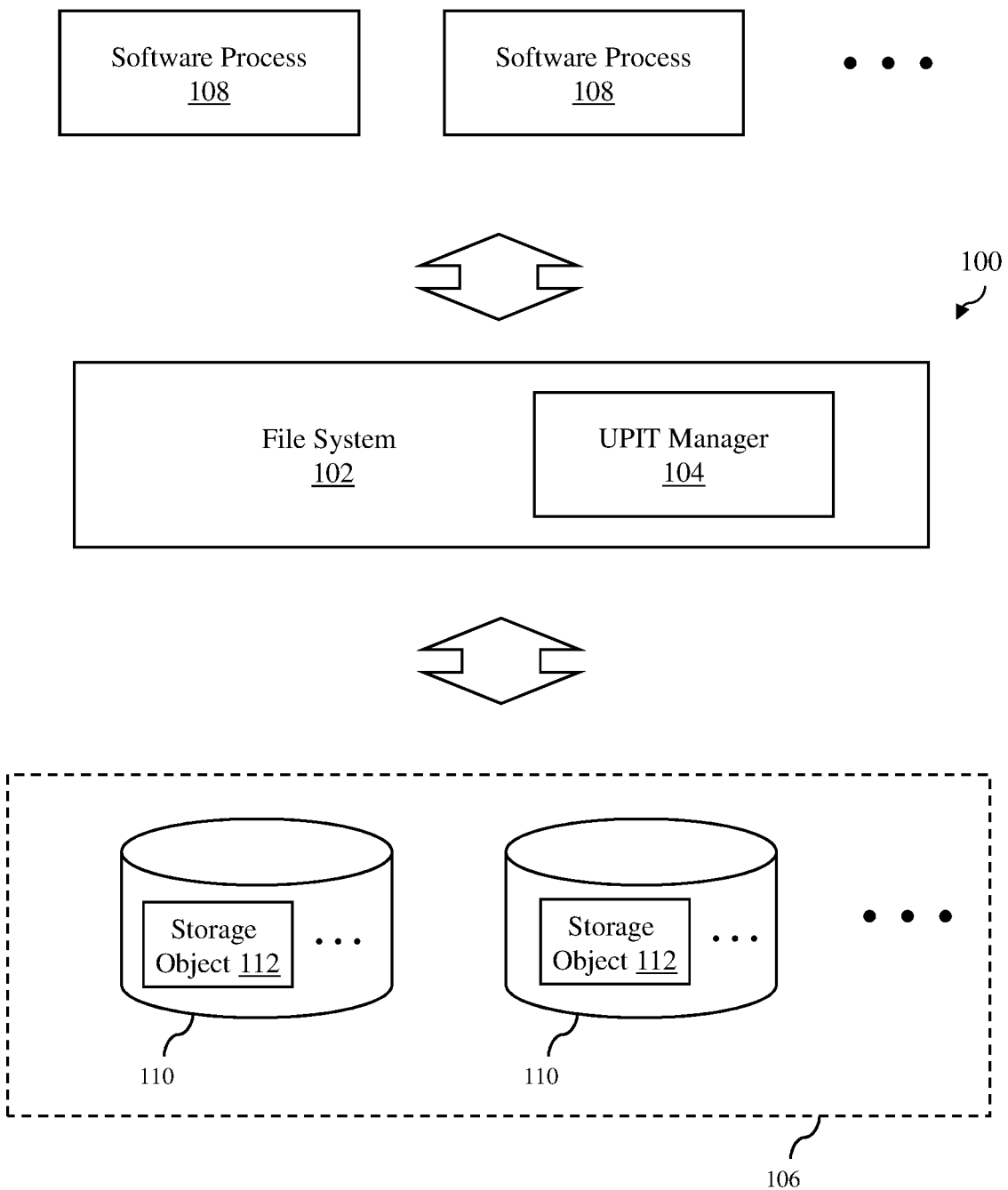
FIG. 1 is a block diagram of a computer system in accordance with an embodiment of the invention.

FIG. 1 depicts a computer system 100 in accordance with an embodiment of the invention. The computer system 100 is shown to include a file system 102 with a universal point-in-time (UPIT) manager 104 and a storage system 106. Other components of the computer system 100 that are commonly found in conventional computer systems, such as memory and processors, are not shown in FIG. 1. The computer system 100 allows software processes 108 to perform file system operations, such as creating/reading/writing/deleting data in the storage system 106, e.g., directories, folders, files and other storage objects, and to perform snapshot operations, such as creating/deleting snapshots of the data in the storage system 106. As described in detail below, the computer system 100 operates to manage snapshots of storage objects to ensure consistency and prevent data corruptions. In addition, the computer system 100 allows copying or cloning storage objects using snapshots of the storage objects to create new replicated storage objects.

The software processes 108 can be any software program, applications or software routines that can run on one or more computers, which can be physical computers, virtual computers, such as VMware virtual machines, or distributed computer systems. The software processes 108 may initiate various data storage operations, such as read, write, delete and rename operations, for data stored in the storage system 106, which are then executed by the computer system 100. In addition, the software processes 108 may also initiate various snapshot operations, such as creating and deleting snapshots for data stored in the storage system 106.

The storage system 106 includes one or more computer data storage devices 110, which are used by the computer system 100 to store data, including metadata of storage objects 112 and actual data of the storage objects 112. In some embodiments, a single storage object may be distributed among multiple storage devices. The data storage devices can be any type of non-volatile storage devices that are commonly used for data storage. As an example, the data storage devices may be, but not limited to, solid-state devices (SSDs), hard disks or a combination of the two.

In an embodiment, the storage system 106 may be a local storage system of the computer system 100, such as hard drive disks in a physical server-grade computer. In another embodiment, the storage system 106 may be a distributed storage system such as a storage area network (SAN). In still another embodiment, the storage system 106 may be a collection of local storage systems of physical computers (not shown) in the computer system 100, such as hard drive disks in a personal computer system, which forms a virtual SAN. In still another embodiment, the storage system 106 may be a remote storage system that can be accessed via a network, such as a network-attached storage (NAS). Depending on the embodiment, the storage system 106 may include other components commonly found in those types of storage systems, such as network adapters, storage drivers and/or storage management servers. The storage system 106 may be scalable, and thus, the number of data storage devices 110 included in the storage system can be changed as needed to increase or decrease the capacity of the storage system to support increase/decrease in workload. Consequently, the exact number of data storage devices 110 included in the storage system 106 can vary from one to hundreds or more.

The storage system 106 may be used to store data in any logical storage units, such as file systems, files, groups of files, datastores, logical unit number (LUN) objects and virtual volumes (VVOLs). In addition, the storage system 106 may be used to store snapshots of any of these logical storage units or snapshots of applications using the data storage, such as virtual computing instances. As used herein, the term "virtual computing instance" is any software entity that can run on a computer system, such as a software application, a software process, a virtual machine and a "container" that provides system-level process isolation, such as a Docker container. Snapshots of virtual computing instances can be viewed as "images" of the virtual computer instances at the time when the snapshots were taken or created. As an example, a snapshot of a virtual machine is a copy of the non-volatile memory or virtual disk of the virtual machine, as well as the volatile memory of the virtual machine, at the time the snapshot was taken. A virtual machine snapshot may also include the configuration or settings of the virtual machine and the BIOS configuration at the time the snapshot was taken.

The file system 102 operates to manage file system operations to and from the software processes 108 and the storage system 106 for storage objects, such as file system volumes, file directories/folders, and files, for shared use of the storage system 106. Thus, the file system 102 organizes the storage resources of the storage system 106 into the file system structures so that the software processes 108 can access the storage objects for various storage operations, such as creating file system objects, deleting file system objects, writing or storing file system objects, reading or retrieving file system objects and renaming file system objects.

The UPIT manager 104 of the file system 102 operates to manage snapshots of storage objects stored in the storage system 106. The UPIT manager 104 manages the creation and deletion of snapshots of storage objects stored in the storage system. The UPIT manager 104 also supports various bookkeeping operations with respect to the snapshots, such as generating identifiers for the snapshots. As explained in more detail below, at least some storage objects and their snapshots are maintained in storage structures referred to herein as UPIT structures, which are stored in the storage system 106, such that each storage object and its snapshots are contained in a single storage structure. The UPIT manager 104 interacts with the UPIT structures to ensure snapshots are created and deleted in these UPIT structures. The UPIT manager 104 also manages linked clones that are created from snapshots of storage objects in UPIT structures, as described in more detail below.

Figure 2A:
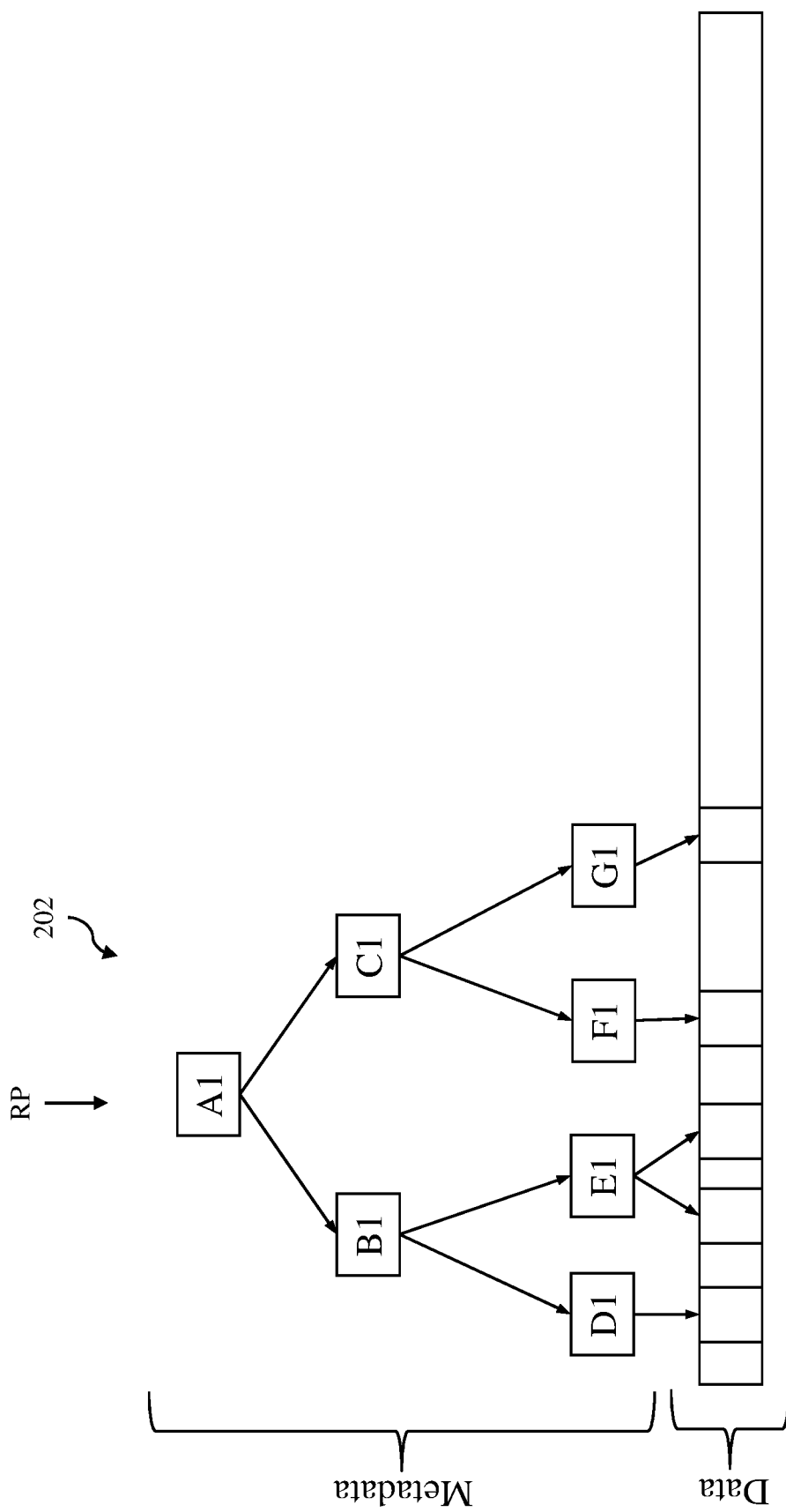
FIGS. 2A-2C illustrate a copy-on-write (COW) B+ tree structure for one storage object managed by a UPIT manager of the computer system in accordance with an embodiment of the invention.
Figure 2B:
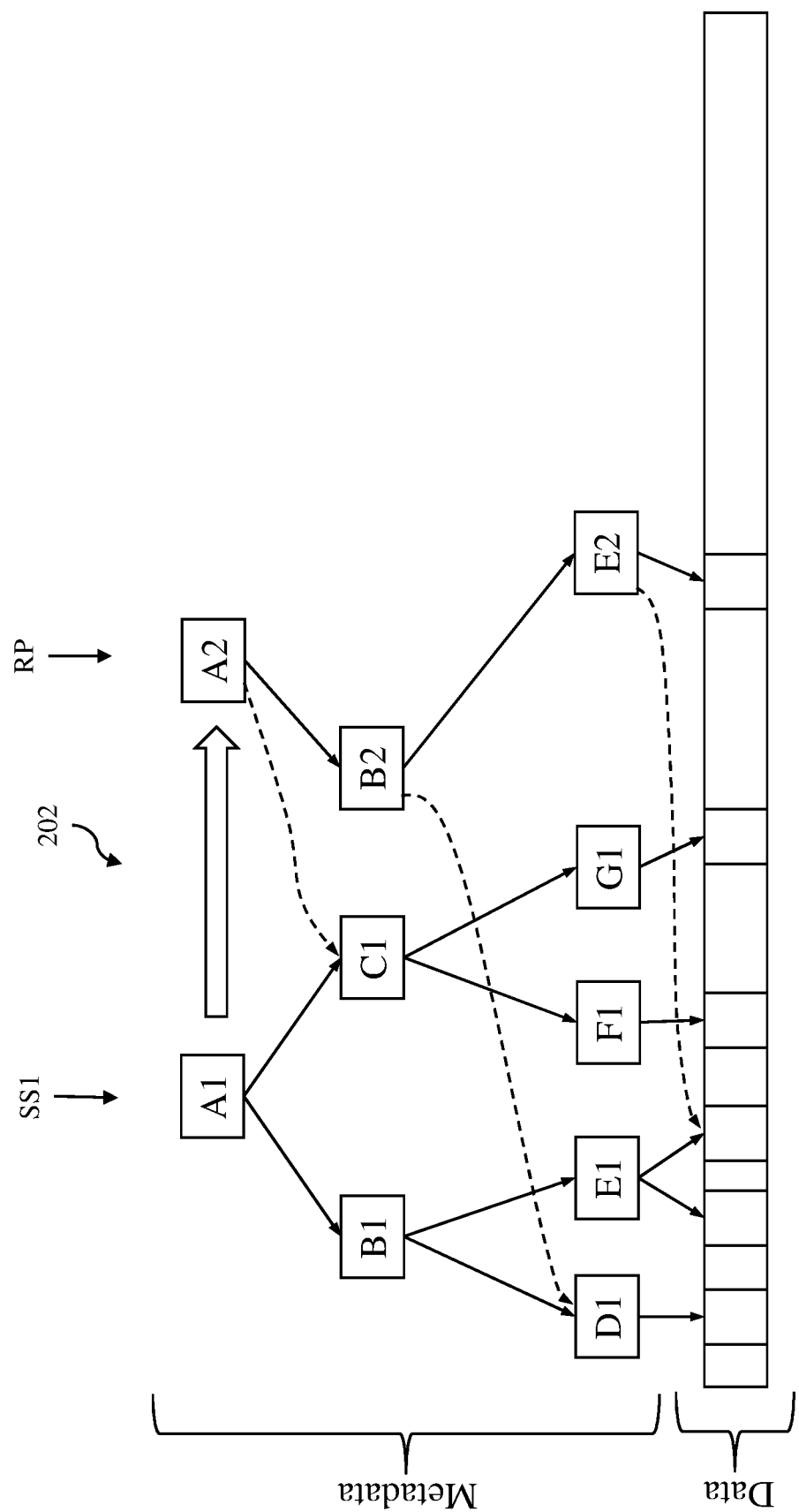
Figure 2C:
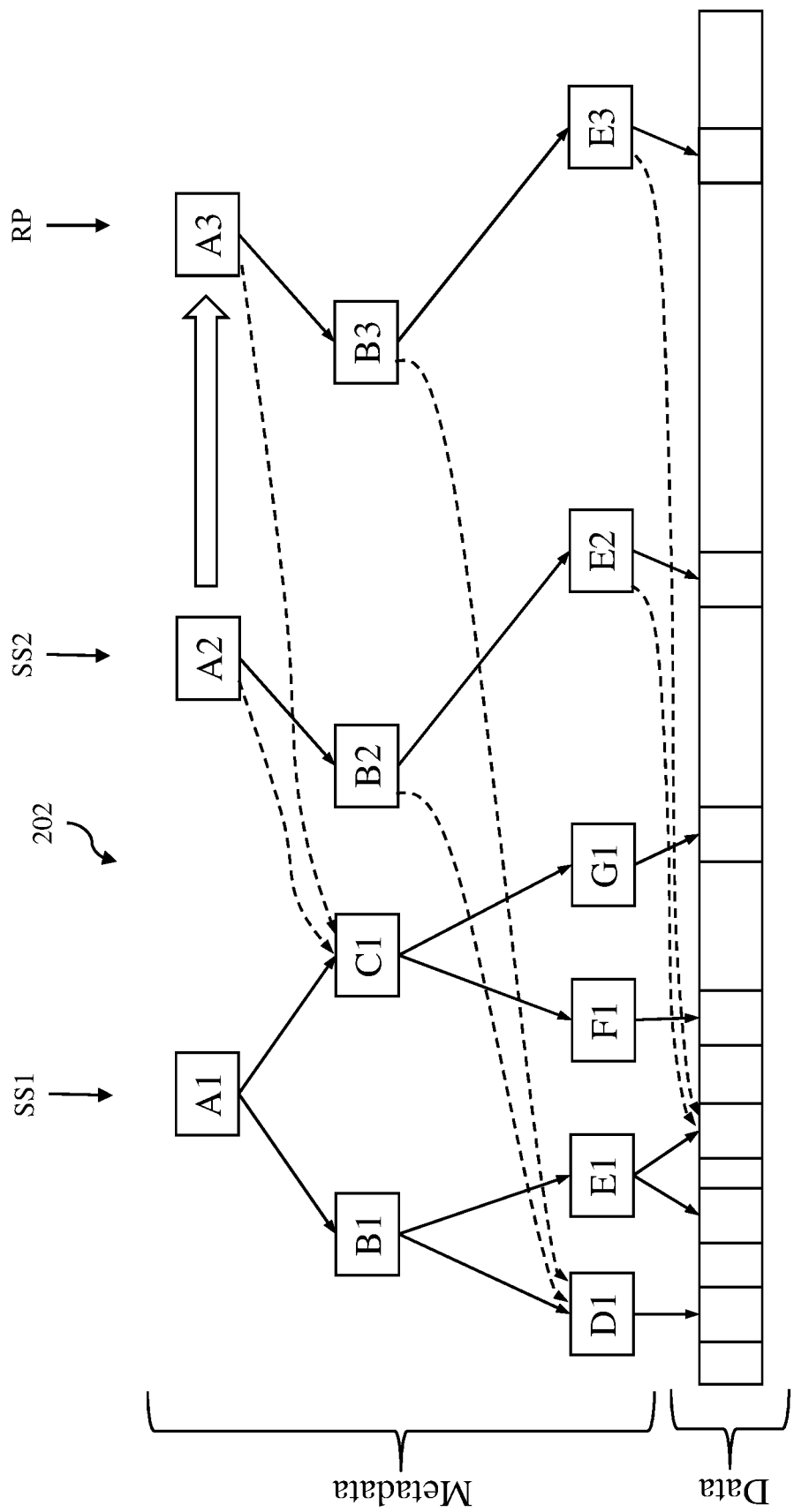

The UPIT manager 104 leverages B tree structures, such as copy-on-write (COW) B+ tree structures, to organize storage objects and their snapshots taken at different times. A COW B+ tree structure for one storage object managed by the UPIT manager 104 in accordance with an embodiment of the invention is illustrated in FIGS. 2A-2C. In this embodiment, the storage object includes data, which is the actual data of the storage object, and metadata, which is information regarding the COW B+ tree structure used to store the actual data in the storage system 106.

FIG. 2A shows the storage object before any snapshots of the storage object were taken. The storage object comprises data, which is stored in data blocks in the storage system 106, as defined by a B+ tree structure 202. Currently, the B+ tree structure 202 includes nodes A1-G1, which define one tree of the B+ tree structure (or one sub-tree if the entire B+ tree structure is viewed as being a single tree). The node A1 is the root node of the tree. The nodes B1 and C1 are index nodes of the tree. The nodes D1-G1 are leaf nodes of the tree, which are nodes on the bottom layer of the tree. As snapshots of the storage object are created, more root, index and leaf nodes, and thus, more trees may be created. Each root node contains references that point to index nodes. Each index node contains references that point to other index nodes. Each leaf node records the mapping from logical block address (LBA) to the physical location or address in the storage system. Each node in the B+ tree structure may include a node header and a number of references or entries. The node header may include information regarding that particular node, such as an identification (ID) of the node. Each entry in the leaf nodes may include an LBA, the entry type (e.g., private or shared), physical extent location, checksum and other characteristics of the data for this entry. In FIG. 2A, the nodes A1-G1 are modifiable. Thus, the tree with the nodes A1-G1 can be viewed as the current state or running point (RP) of the storage object.

FIG. 2B shows the storage object after a first snapshot SS1 of the storage object was taken. Once the first snapshot SS1 is created or taken, all the nodes in the B+ tree structure become immutable (i.e., cannot be modified). In FIG. 2B, the nodes A1-G1 have become immutable, preserving the storage object to a point in time when the first snapshot SS1 was taken. Thus, the tree with the nodes A1-G1 can be viewed as the first snapshot SS1. In an embodiment, the first snapshot of a storage object may include a snapshot generation identification, such as a number, and data regarding all the nodes in the B+ tree structure, e.g., the nodes A1-G1 in the example shown in FIG. 2B. When a modification of the storage object is made, after the first snapshot is created, a new root node and one or more index and leaf nodes are created. In FIG. 2B, new nodes A2, B2 and E2 have been created after the first snapshot SS1 was taken, which now define the running point of the storage object. Thus, the nodes A2, B2 and E2, as well as the nodes C1, D1, F1 and G1, which are common nodes for both the first snapshot SS1 and the current running point, represent the current state of the storage object.

FIG. 2C shows the storage object after a second snapshot SS2 of the storage object was taken. As noted above, once a snapshot is created or taken, all the nodes in the B+ tree structure become immutable. Thus, in FIG. 2C, the nodes A2, B2 and E2 have become immutable, preserving the storage object to a point in time when the second snapshot SS2 was taken. Thus, the tree with the nodes A2, B2, E2, C1, D1, F1 and G1 can be viewed as the second snapshot. In an embodiment, any snapshot of a storage object after the first snapshot include a snapshot generation identification, such as a number, and data regarding nodes in the B+ tree structure that differ from the previous snapshot of the storage object, e.g., the nodes A2, B2 and E2 in the example shown in FIG. 2C. When a modification of the storage object is made after the second snapshot SS2 is created, a new root node and one or more index and leaf nodes are created. In FIG. 2C, new nodes A3, B3 and E3 have been created after the second snapshot was taken. Thus, nodes A3, B3 and E3, as well as the nodes C1, D1, F1 and G1, which are common nodes for both the second snapshot and the current running point, represent the current state of the storage object.

Figure 3A:
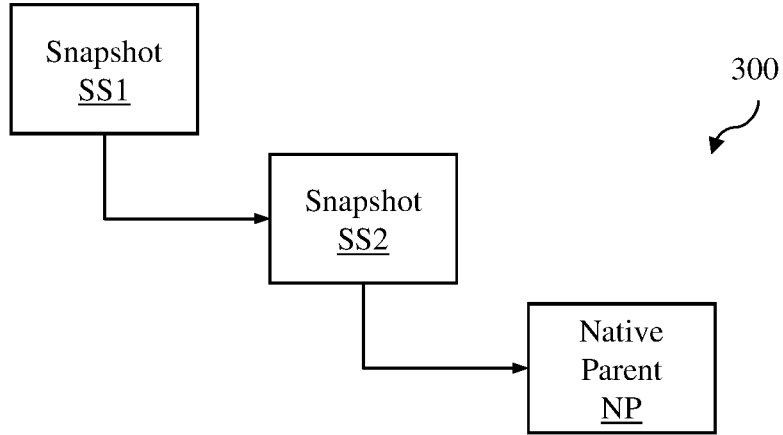
FIGS. 3A and 3B illustrate snapshot hierarchy and relationship in accordance with an embodiment of the invention.

In this manner, multiple snapshots of a storage object can be created at different times. These multiple snapshots create a hierarchy of snapshots. FIG. 3A illustrates a hierarchy 300 of snapshots for the example described above with respect to FIGS. 2A-2C. As shown in FIG. 3A, the hierarchy 300 includes a first snapshot SS1, a second snapshot SS2 and a native parent NP. The native parent NP is the current state of the storage object, which is the same as the running point for the storage object. Thus, the snapshot hierarchy 300 illustrates how snapshots of a storage object can be visualized.

Figure 3B:
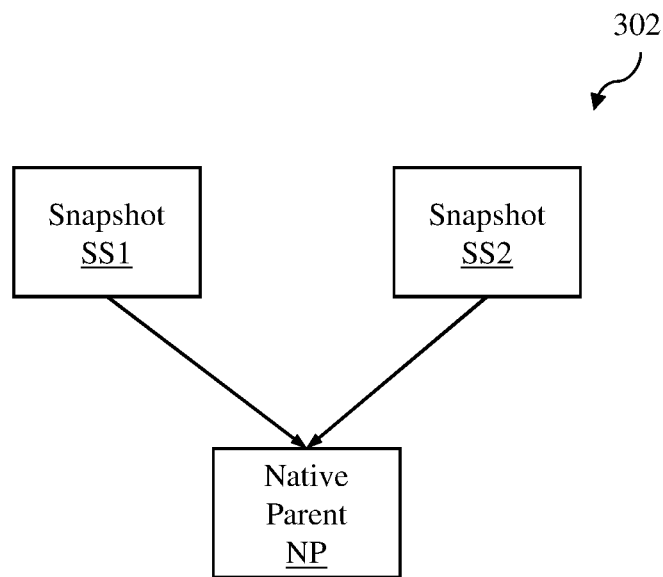

Each snapshot of a storage object can be viewed as a child of a native parent since each snapshot is a point-in-time representation of the native parent and is derived from the native parent. In an embodiment, all the snapshots of a storage object can be referenced by the storage object. Thus, the storage object can maintain a record of the snapshots of the storage object. This relationship 302 is illustrated in FIG. 3B, which shows that the first and second snapshots SS1 and SS2 are referenced by the native parent NP.

Unlike conventional snapshots of storage objects, which are maintained as separate storage objects, the file system 102 and the UPIT manager 104 use a single storage structure to store the native parent and all referenced snapshots for each storage object. Thus, all the information regarding all the snapshots of a storage object is contained in the single structure, which will be referred to herein as universal point-in-time (UPIT) structure. In an embodiment, the UPIT structure includes a directory of snapshots contained in the UPIT structure, and associated with each of these individual points in time or snapshots is a reference count that indicates inter alia the number of linked clones created off of that snapshot.

Figure 4:
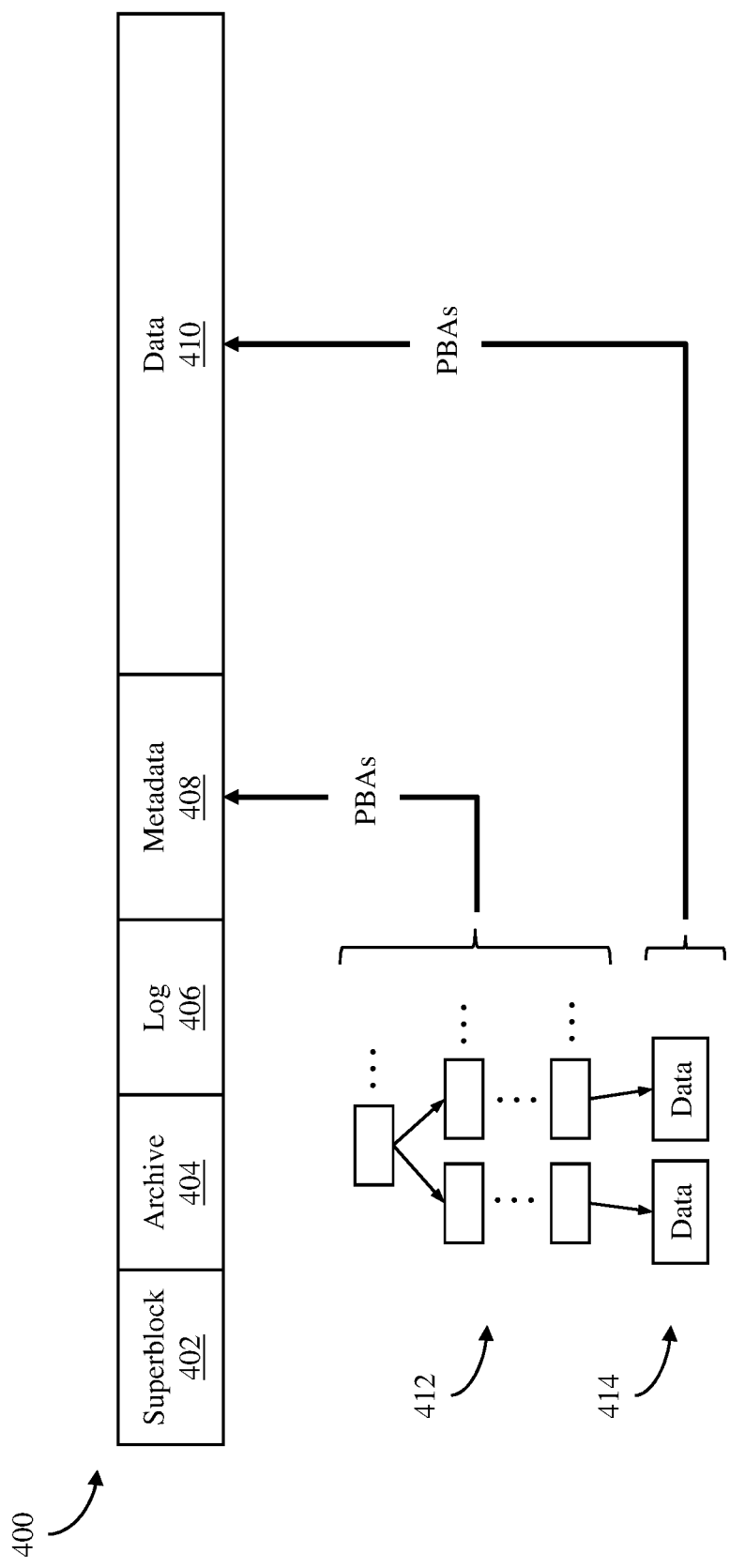
FIG. 4 is a block diagram of a universal point-in-time (UPIT) structure for a storage object in accordance with an embodiment of the invention.

Turning now to FIG. 4, a UPIT structure 400 for a storage object in accordance with an embodiment of the invention is shown. The UPIT structure 400 includes a superblock section 402, an archive section 404, a log section 406, a metadata section 408 and a data section 410. The superblock section includes information regarding checkpointing information. The archive section includes information regarding historical and current snapshots, such as creation and deletion of snapshots at different points in time. The archive section also includes information regarding linked clones that have been created from the snapshots in the UPIT structure 400. The log section includes logs of input/output (I/O) operations for the UPIT structure 400 (e.g., insert and delete data operations). The metadata section includes information regarding the nodes of a B+ tree structure 412 being used to store data 414 of the storage object. Thus, the metadata section includes all the nodes of the snapshots and the native parent, some of which are shared by the snapshots and the native parent. The nodes of the snapshots and the native parent are stored in the metadata section using physical block addresses (PBAs) that correspond to physical locations in the metadata section. The data section includes the data 412 of the storage object being stored in the UPIT structure. Thus, the data section includes data for the snapshots and the native parent. The data for the snapshots and the native parent is stored in the data section using physical block addresses (PBAs) that correspond to physical locations in the data section.

In this embodiment, the sizes of the different sections of the UPIT structure 400 are static and predefined. Thus, as more inputs/outputs (I/Os) are processed and more snapshots are created, available space in the different sections of the UPIT structure 400 will be consumed. The amount of space consumed by the I/Os and snapshots in the superblock section 402, the archive section 404 and the log section 406 is manageable. However, the amount of space consumed by the I/Os and snapshots in the metadata section 408 and the data section 410 of the UPIT structure 400 may be significant. Since the sizes of the metadata section 408 and the data section 410 of the UPIT structure 400 are fixed, these sections may run out of space as new I/Os are processed and new snapshots are created because, in addition to increased data being stored, unusable noncontiguous spaces are created in these sections as data blocks are repeatedly written and deleted. One technique to resolve this issue is to compress or compact the data blocks in the metadata section 408 and the data section 410 to remove the unusable noncontiguous spaces in these sections to create larger contiguous free spaces, which may then be used to write new data blocks. However, such compression will typically require significant processing since the PBAs of the stored metadata and data must be changed and corresponding changes must be reflected in many of the nodes of the B+ tree structure. Alternatively, new sections may have to be created, which means that multiple sections or partitions in physical storage devices for the same data type would have to be managed by the UPIT manager 104 of the file system 102. Both of these possible solutions are not efficient, and thus, would add significant complexity to the management of the UPIT structure 400.

In order to resolve this issue, the file system 102 utilizes additional B+ tree structures to manage metadata being stored in the metadata section 408 and to manage data being stored in the data section 410 of the UPIT structure 400. Thus, in this embodiment, three B+ tree structures are used to store data of a storage object in a UPIT structure. The first B+ tree structure, which will sometimes be referred to herein as the object B+ tree structure, is used to manage the data for the snapshots and the native parent of a storage object, which produces metadata (nodes of the B tree structure) to store the data, as illustrated in FIGS. 2A-2C. Thus, the first B tree structure includes PBAs for the metadata to be stored and PBAs for the data to be stored. The second B+ tree structure, which will sometimes be referred to herein as the metadata system file B+ tree structure, is used to manage the metadata from the first or object B+ tree structure to be stored in the metadata section 408 of the UPIT structure 400. The second B+ tree structure in effect takes the PBAs for the metadata from the object B+ tree structure as LBAs and translates the LBAs to real PBAs, which are then used to actually store the metadata in the metadata section 408 of the UPIT structure 400. The third B+ tree structure, which will sometimes be referred to herein as the data system file B+ tree structure, is used to manage the data from the object B+ tree structure to be stored in the data section 410 of the UPIT structure 400. The third B+ tree structure in effect takes the PBAs for the data from the object B+ tree structure as LBAs and translates the LBAs to real PBAs, which are then used to actually store the data in the data section 410 of the UPIT structure 400. Thus, the PBAs for the metadata and the data from the object B+ tree structure are not used to actually store the metadata and the data in the UPIT structure 400, but rather used as inputs for the metadata and data system file B+ tree structures to determine the real PBAs to store the metadata and data in the UPIT structure 400. Therefore, the PBAs for the metadata and the data from the object B+ tree structure will sometimes be referred to herein as virtual PBAs. The use of these additional B+ tree structures for storing a storage object in a UPIT structure is illustrated in FIG. 5.

Figure 5:
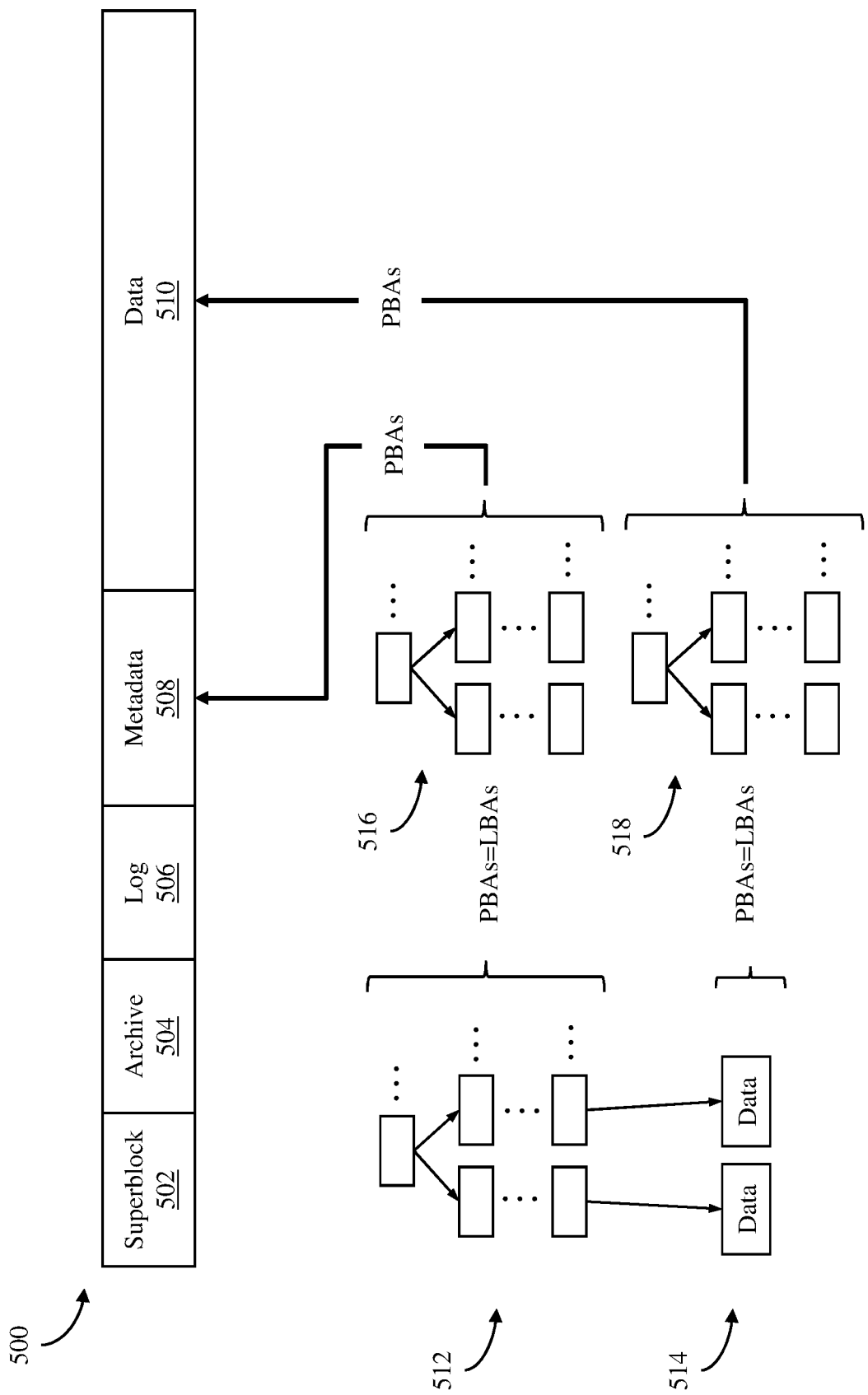
FIG. 5 is a block diagram of a multi-B tree UPIT structure for a storage object in accordance with an embodiment of the invention.

As shown in FIG. 5, a multi-B tree UPIT structure 500 in accordance an embodiment of the invention is shown. Similar the UPIT structure 400, the multi-B tree UPIT structure 500 includes a superblock section 502, an archive section 504, a log section 506, a metadata section 508 and a data section 510. The superblock section 502 includes information regarding checkpointing information. The archive section 504 includes information regarding historical and current snapshots, such as creation and deletion of snapshots at different points in time. The archive section 504 also includes information regarding linked clones that have been created from the snapshots in the multi-B tree UPIT structure 500. The log section 506 includes logs of input/output (I/O) operations for the multi-B tree UPIT structure 500 (e.g., insert and delete data operations). In some implementations, the superblock section 502, the archive section 504 and the log section 506 of the multi-B tree UPIT structure 500 may be identical to the superblock section 402, the archive section 404, the log section 406 of the UPIT structure 400.

The metadata section 508 includes information regarding the nodes of an object B+ tree structure 512 being used to store data 514 of a storage object. Thus, the metadata section 508 includes all the nodes of any snapshots and the native parent of the storage object, some of which are shared by the snapshots and the native parent. However, unlike the metadata section 408 of the UPIT structure 400, the metadata section 508 of the multi-B tree UPIT structure 500 is used to store the nodes of the object B+ tree structure using PBAs resulting from a metadata system file B+ tree structure 516, which correspond to physical locations in the metadata section 508. The metadata system file B+ tree structure 412 may be stored as a separate metadata system file in the storage system 106.

The data section 510 includes the data 514 of the storage object being stored in the multi-B tree UPIT structure 500. Thus, the data section 510 includes the data 514 for any snapshots and the native parent of the storage object. However, unlike the data section 410 of the UPIT structure 400, the data section 510 of the multi-B tree UPIT structure 500 is used to store the data 514 for any snapshots and the native parent of the storage object using PBAs resulting from a data system file B+ tree structure 518, which correspond to physical locations in the data section 510. The data system file B+ tree structure may be stored as a separate data system file in the storage system 106.

The use of the metadata system file B+ tree structure 516 and the data system file B+ tree structure 518 allows the UPIT manager 104 to more efficiently manage space in the metadata section 508 and the data section 510 of the multi-B tree UPIT structure 500.

In some implementations, the metadata and data from the object B+ tree structure are both written in a common data/metadata section of a multi-B tree UPIT structure in an interleaved manner. Thus, when new data is written, both the new data and the corresponding metadata (new or modified nodes of the object B+ tree structure) are written sequentially in the common data/metadata section of the multi-B tree UPIT structure. In addition, information regarding available space in the data and metadata sections of the multi-B tree UPIT structure may be inserted in the common data/metadata section of the multi-B tree UPIT structure. The use of a common data/metadata section in a multi-B tree UPIT structure is illustrated in FIG. 6.

Figure 6:
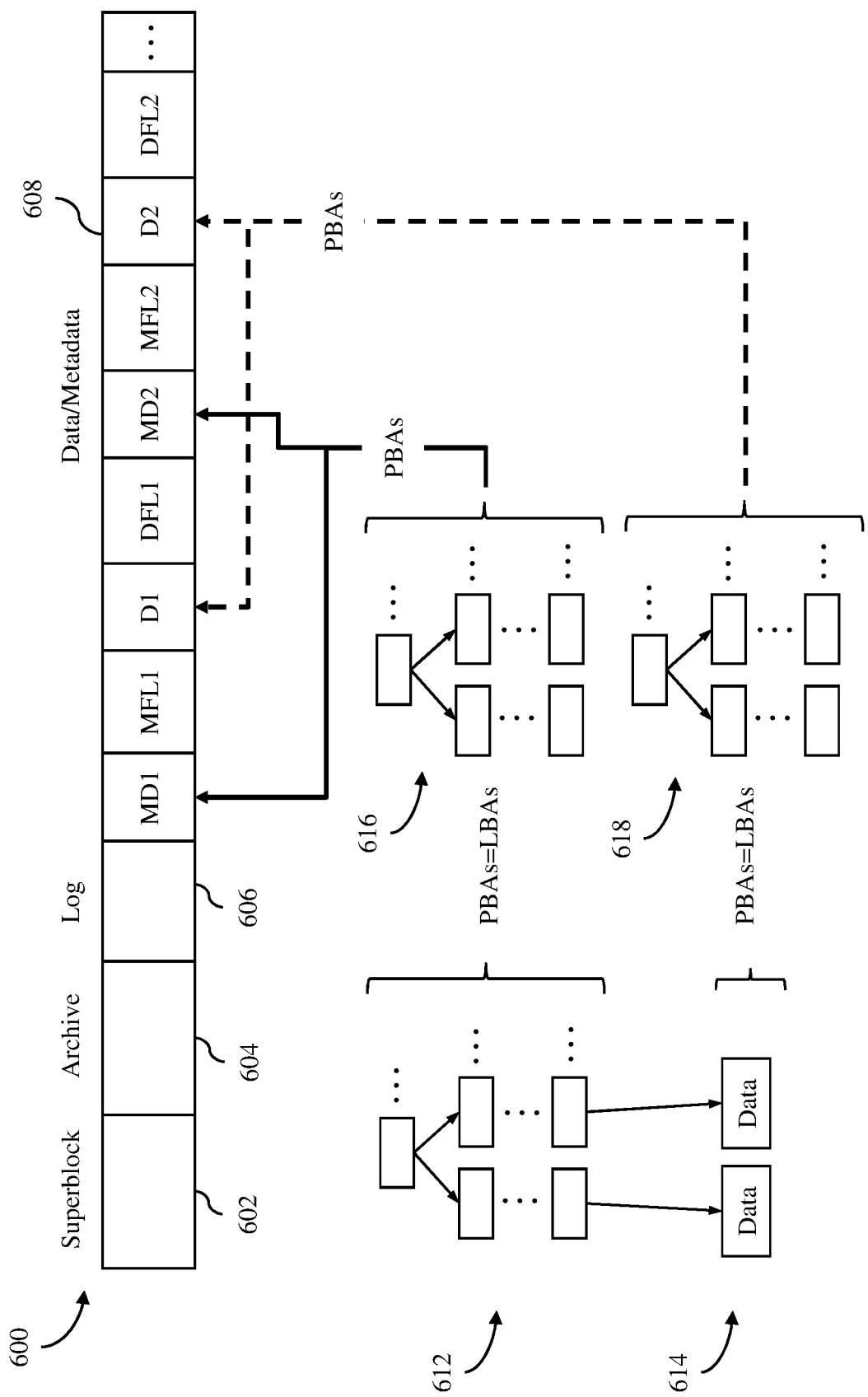
FIG. 6 is a block diagram of a multi-B tree UPIT structure for a storage object in accordance with another embodiment of the invention.

As shown in FIG. 6, a multi-B tree UPIT structure 600 for a storage object in accordance with an embodiment of the invention includes a superblock section 602, an archive section 604, a log section 606 and a common data/metadata section 608. The superblock section 602, the archive section 604 and the log section 606 of the multi-B tree UPIT structure 600 may be similar or identical to the superblock section 502, the archive section 504 and the log section 506 of the multi-B tree UPIT structure 500. The common data/metadata section 608 is used to store both data 614 for any snapshots and the native parent of the storage object using PBAs resulting from a data system file B+ tree structure 618 and the metadata (i.e., the nodes) of an object B+ tree structure 612 using PBAs resulting from a metadata system file B+ tree structure 616 in an interleaved fashion. Thus, as illustrated in FIG. 6, data D1 and corresponding metadata MD1 are written in the common data/metadata section 608 and then subsequent data D2 and corresponding MD2 are written in the common data/metadata section 608. Also written in the common data/metadata section 608 are free lists for data and metadata, which specify available space in the common data/metadata section 608 for new data and new metadata. Thus, in FIG. 6, metadata free list MFL1 has been added to the common data/metadata section 608 after the metadata MD1 has been written. In addition, data free list DFL1 has been added to the common data/metadata section 608 after the data D1 has been written. Similarly, metadata free list MFL2 has been added to the common data/metadata section 608 after the metadata MD2 has been written. In addition, data free list DFL2 has been added to the common data/metadata section 608 after the data D2 has been written. The order in which metadata, data and free lists are written in the common data/metadata section 608 can vary. In some embodiments, the metadata, data and free lists can be written anywhere in the common data/metadata section 608.

Figure 7:
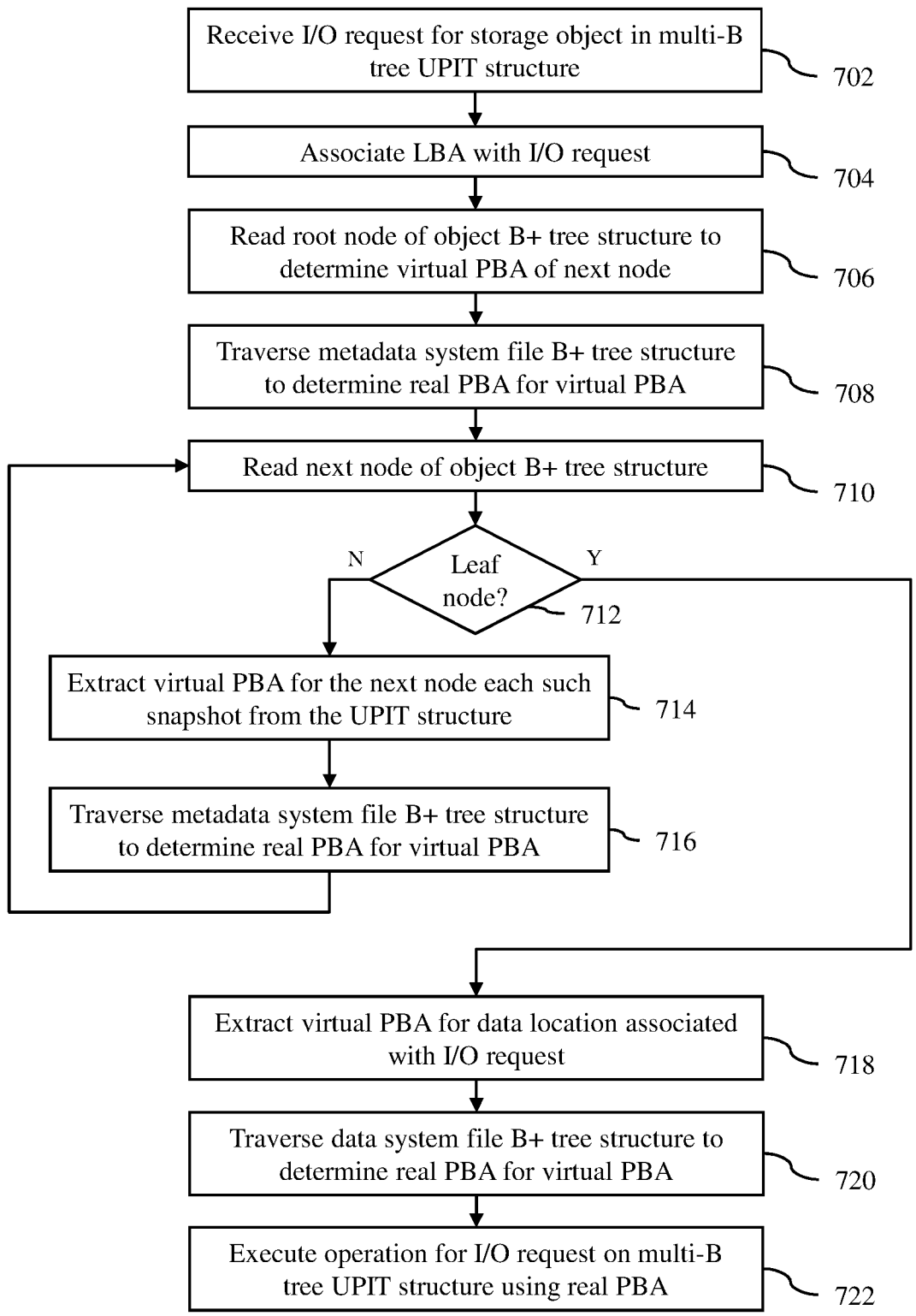
FIG. 7 is a flow diagram of an operation of the UPIT manager 104 with respect to I/O requests for storage objects stored in multi-B tree UPIT structures in accordance with an embodiment of the invention

The operation of the UPIT manager 104 with respect to I/O requests for storage objects stored in multi-B tree UPIT structures in accordance with an embodiment of the invention will now be described with reference to the flow diagram of FIG. 7. At block 702, a I/O request for a storage object stored in a multi-B tree UPIT structure is received at the file system 102 from a requesting entity. The I/O request can be any type of a file system operation request. As an example, the I/O request may be a write request to insert a block of data to the storage object stored in the multi-B tree UPIT structure or a read request to read a block of data in the storage object stored in the multi-B tree UPIT structure. The requesting entity can be any software application. As an example, the I/O request may be from a virtualization software running on a host computer that is hosting a virtual machine in response to user input. In this example, the storage object may be data that supports the virtual machine, such as a virtual disk object.

At block 704, an LBA is associated with the I/O request by the UPIT manager 104. The associated LBA identifies a contiguous logical storage space in the multi-B tree UPIT structure to execute the I/O request. As an example, the contiguous logical storage space in the multi-B tree UPIT structure can be used to write a block of data to the multi-B tree UPIT structure or to access a desired block of data from the multi-B tree UPIT structure for read or modification operation. Next, at block 706, the root node of an object B+ tree structure for the current running point is read by the UPIT manager 104 to determine the virtual PBA of the next node of the tree structure. In an embodiment, the physical location of the root node of the object B+ tree structure for the current running point in the multi-B tree UPIT structure is known to the UPIT manager 104. Next, at block 708, a metadata system file B+ tree structure is traversed by the UPIT manager 104 using the virtual PBA as an input to determine the real PBA of the next node in the multi-B tree UPIT structure.

Next, at block 710, the next node of the object B+ tree structure stored in the metadata section of the multi-B tree UPIT structure is read by the UPIT manager 104 using the real PBA of the multi-B tree UPIT structure for the node. Next, at block 712, a determination is made whether this node is a leaf node of the object B+ tree structure. If it is determined that the node is not a leaf node, then the operation proceeds to block 714, where the virtual PBA of the next node of the tree structure is extracted from the current node by the UPIT manager 104. Next, at block 716, the metadata system file B+ tree structure is traversed by the UPIT manager 104 using the virtual PBA as an input to determine the real PBA of the next node of the object B+ tree structure in the metadata section of the multi-B tree UPIT structure. The operation then proceeds back to block 710.

However, if it is determined that the node is a leaf node at block 712, then the operation proceeds to block 718, where the virtual PBA for a data location associated with the I/O request is extracted from the node by the UPIT manager 104. As an example, the data location may be the location of a block of data to be read or the location where a new block of data is to be written. Next, at block 720, a data system file B+ tree structure is traversed by the UPIT manager 104 using the virtual PBA as an input to determine the real PBA for the data location associated with the I/O request in the multi-B tree UPIT structure. The real PBA may include more than one physical address so that the data block can be identified in different noncontiguous spaces in the data section of the multi-B tree UPIT structure, which may be available or free spaces to write data or unavailable or occupied spaces in which data is stored. Next, at block 722, an operation for the I/O request is executed on the multi-B tree UPIT structure using the real PBA by the UPIT manager 104. As an example, the operation for the I/O request may be a write operation for a new block of data to the space or spaces defined by the real PBA or a read operation to read a block of data from the space of spaces defined by the read PBA.

During the above process, if new nodes of the object B+ tree structure need to be created, e.g., for writing requests and snapshot creations, the metadata system file B+ tree structure is used by the UPIT manager 104 to determine real PBAs to write the new nodes of the object B+ tree structure as metadata in the multi-B tree UPIT structure. Again, the real PBA may include more than one physical location address so that the metadata corresponding to the new nodes can actually be written in different noncontiguous spaces in the multi-B tree UPIT structure.

In this manner, previously unusable noncontiguous spaces in one or more regions of the multi-B tree UPIT structure can be used to more efficiently store the metadata and data in the multi-B tree UPIT structure.

Figure 8:
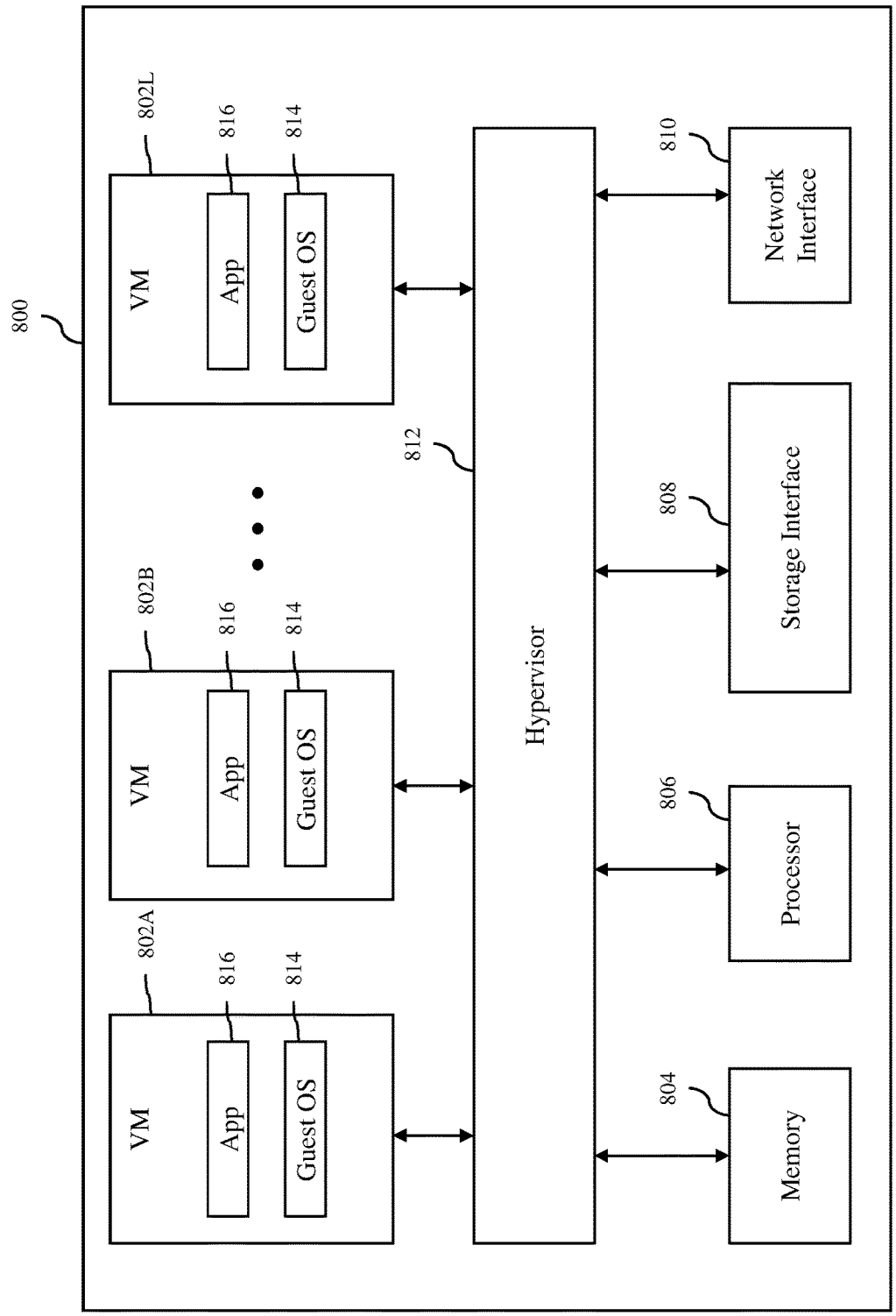
FIG. 8 is a block diagram of a physical computer system with a number of virtual machines in which the file system in accordance with an embodiment of the invention may be implemented.

The file system 102 may be implemented as part of an operating system (OS) of a computer system, which may be a physical computer system, such as a physical server, or a virtual computer system, such as a virtual machine. Turning now to FIG. 8, a physical computer system 800 in which the file system 102 may be implemented is shown. In FIG. 8, the physical connections between the various components of the computer system are not illustrated. As shown in FIG. 8, the physical computer system is configured to support a number of virtual machines (VMs) 802A, 802B . . . 802L (where L is a positive integer). The number of VMs supported by the physical computer system can be anywhere from one to more than one hundred. The exact number of VMs supported by the physical computer system is only limited by the physical resources of the physical computer system. The VMs share at least some of the hardware resources of the physical computer system, which include one or more system memories 804, one or more processors 806, a storage interface 808, and a network interface 810. Each system memory, which may be random access memory (RAM), is the volatile memory of the physical computer system. Each processor can be any type of a processor, such as a central processing unit (CPU) commonly found in a personal computer. The storage interface is an interface that allows that physical computer system to communicate with one or more physical storage systems. As an example, the storage interface may be a host bus adapter or a network file system interface. The network interface is an interface that allows the physical computer system to communicate with other devices through one or more computer networks. As an example, the network interface may be a network adapter.

In the illustrated embodiment, the VMs 802A, 802B . . . 802L run on "top" of a hypervisor 812, which is a software interface layer that, using virtualization technology, enables sharing of the hardware resources of the physical computer system 800 by the VMs. However, in other embodiments, one or more of the VMs can be nested, i.e., a VM running in another VM. Any computer virtualization architecture can be implemented. For example, the hypervisor may run on top of the physical computer system's operating system or directly on hardware of the physical computer system. With the support of the hypervisor, the VMs provide isolated execution spaces for guest software. Each VM may include a guest operating system 814, one or more guest applications 816. The guest operating system manages virtual system resources made available to the corresponding VM by the hypervisor, and, among other things, the guest operating system forms a software platform on top of which the guest applications run.

The file system 102 may be implemented in one or more VMs 802A, 802B . . . 802L running in the physical computer system 800 as part of their OS, i.e., the guest OS 814. Thus, in this implementation, the file system 102 allows guest applications 816 to access physical storage systems available to the physical computer system. The file system 102 may also be implemented in the physical computer system as part of the host OS. Thus, the file system 102 may be implemented in the OS of any physical or virtual computer system. In other embodiments, the file system 102 may be implemented as a distributed file system, where agents of the file system are installed in multiple physical or virtual computer systems.

Figure 9:
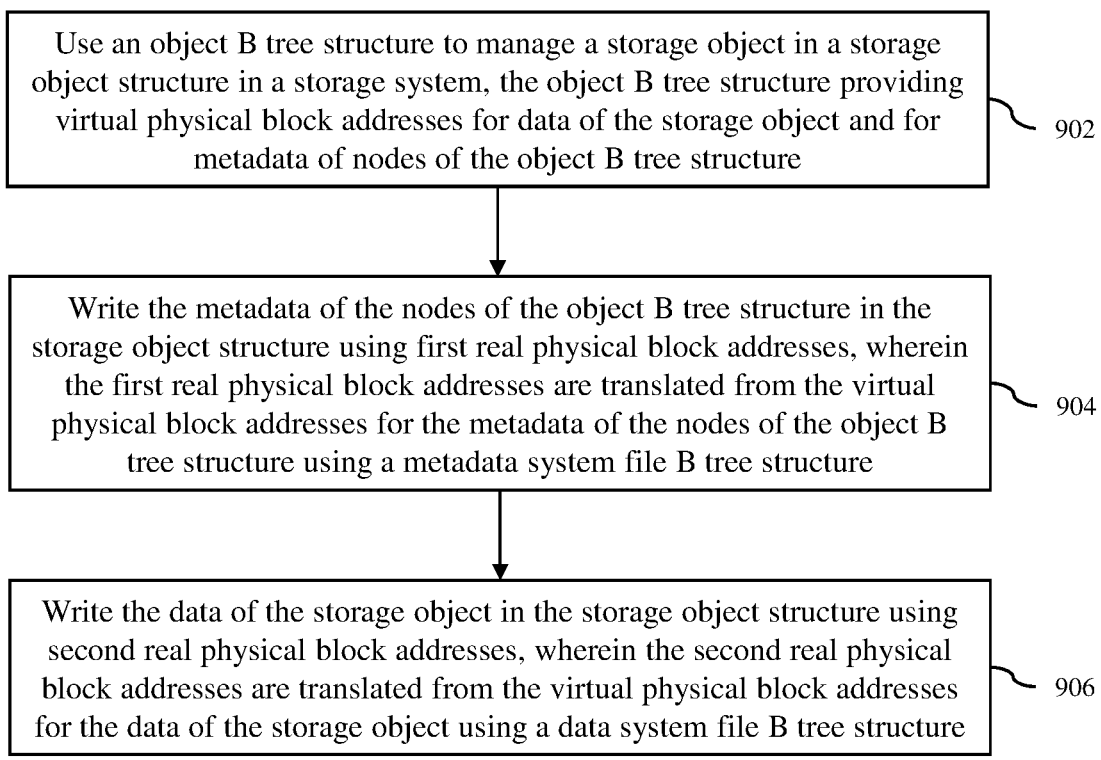
FIG. 9 is a flow diagram of a method for managing space in storage object structures stored in a storage system in accordance with an embodiment of the invention.

A method for managing space in storage object structures stored in a storage system, in accordance with an embodiment of the invention is described with reference to a flow diagram of FIG. 9. At block 902, an object B tree structure is used to manage a storage object in a storage object structure in the storage system. The object B tree structure may be a COW B+ tree structure used by the UPIT manager 104. The object B tree structure provides virtual physical block addresses for data of the storage object and for metadata of nodes of the object B tree structure. At block 904, the metadata of the nodes of the object B tree structure is written in the storage object structure using first real physical block addresses, which are translated from the virtual physical block addresses for the metadata of the nodes of the object B tree structure using a metadata system file B tree structure. At block 906, the data of the storage object is written in the storage object structure using second real physical block addresses, which are translated from the virtual block addresses for the data of the storage object using a data system file B tree structure.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing space in storage object structures stored in a storage system, the method comprising:
   managing a storage object in a storage object structure in the storage system by storing virtual physical block addresses for data of the storage object in nodes of a first B tree structure;
   writing metadata of the nodes of the first B tree structure in the storage object structure at physical locations in the storage system that correspond to first real physical block addresses for the metadata of the nodes of the first B tree structure, wherein the first real physical block addresses are exclusively stored in a second B tree structure, wherein the first real physical block addresses are translated from the virtual physical block addresses for the metadata of the nodes of the first B tree structure, and wherein the virtual physical block addresses for the metadata of the nodes of the first B tree structure are input to the second B tree structure as logical physical block addresses to determine the first real physical block addresses for the metadata of the nodes of the first B tree structure; and
   writing the data of the storage object in the storage object structure at physical locations in the storage system that correspond to second real physical block addresses for the data of the storage object, wherein the second real physical block addresses are exclusively stored in a third B tree structure, wherein the second real physical block addresses are translated from the virtual physical block addresses for the data of the storage object, and wherein the virtual physical block addresses for the data of the storage object are input to the third B tree structure as logical physical block addresses to determine the second real physical block addresses for the data of the storage object.

2. The method of claim 1, wherein both the data of the storage object and the metadata of the nodes of the first B tree structure are written in a common section of the storage object structure.

3. The method of claim 2, wherein the data of the storage object and the metadata of the nodes of the first B tree structure are written in the common section of the storage object structure with free lists for the data and the metadata.

4. The method of claim 2, wherein the storage object structure includes a superblock section, an archive section and a log section.

5. The method of claim 1, wherein the first B tree structure is a copy-on-write B+ tree structure.

6. The method of claim 1, wherein the storage object is a namespace object of a virtual machine or a virtual disk object of the virtual machine.

7. A non-transitory computer-readable storage medium containing program instructions for managing space in storage object structures stored in a storage system, wherein execution of the program instructions by one or more processors of a computer system causes the one or more processors to perform steps comprising:
    managing a storage object in a storage object structure in the storage system by storing virtual physical block addresses for data of the storage object in nodes of a first B tree structure;
    writing metadata of the nodes of the first B tree structure in the storage object structure at physical locations in the storage system that correspond to first real physical block addresses for the metadata of the nodes of the first B tree structure, wherein the first real physical block addresses are exclusively stored in a second B tree structure, wherein the first real physical block addresses are translated from the virtual physical block addresses for the metadata of the nodes of the first B tree structure, and wherein the virtual physical block addresses for the metadata of the nodes of the first B tree structure are input to the second B tree structure as logical physical block addresses to determine the first real physical block addresses for the metadata of the nodes of the first B tree structure; and
    writing the data of the storage object in the storage object structure at physical locations in the storage system that correspond to second real physical block addresses for the data of the storage object, wherein the second real physical block addresses are exclusively stored in a third B tree structure, wherein the second real physical block addresses are translated from the virtual physical block addresses for the data of the storage object, and wherein the virtual physical block addresses for the data of the storage object are input to the third B tree structure as logical physical block addresses to determine the second real physical block addresses for the data of the storage object.

8. The computer-readable storage medium of claim 7, wherein both the data of the storage object and the metadata of the nodes of the first B tree structure are written in a common section of the storage object structure.

9. The computer-readable storage medium of claim 8, wherein the data of the storage object and the metadata of the nodes of the first B tree structure are written in the common section of the storage object structure with free lists for the data and the metadata.

10. The computer-readable storage medium of claim 8, wherein the storage object structure includes a superblock section, an archive section and a log section.

11. The computer-readable storage medium of claim 7, wherein the first B tree structure is a copy-on-write B+ tree structure.

12. The computer-readable storage medium of claim 7, wherein the storage object is a namespace object of a virtual machine or a virtual disk object of the virtual machine.

13. A computer system comprising:
    a storage system having computer data storage devices to store at least one storage object structure;
    memory; and
    a processor configured to:
    manage a storage object in a storage object structure in the storage system by storing virtual physical block addresses for data of the storage object in nodes of a first B tree structure;
    write metadata of the nodes of the first B tree structure in the storage object structure at physical locations in the storage system that correspond to first real physical block addresses for the metadata of the nodes of the first B tree structure, wherein the first real physical block addresses are exclusively stored in a second B tree structure, wherein the first real physical block addresses are translated from the virtual physical block addresses for the metadata of the nodes of the first B tree structure, and wherein the virtual physical block addresses for the metadata of the nodes of the first B tree structure are input to the second B tree structure as logical physical block addresses to determine the first real physical block addresses for the metadata of the nodes of the first B tree structure; and
    write the data of the storage object in the storage object structure at physical locations in the storage system that correspond to second real physical block addresses for the data of the storage object, wherein the second real physical block addresses are exclusively stored in a third B tree structure, wherein the second real physical block addresses are translated from the virtual physical block addresses for the data of the storage object, and wherein the virtual physical block addresses for the data of the storage object are input to the third B tree structure as logical physical block addresses to determine the second real physical block addresses for the data of the storage object.

14. The computer system of claim 13, wherein the data of the storage object and the metadata of the nodes of the first B tree structure are written in a common section of the storage object structure with free lists for the data and the metadata.

* * * * *